United States Patent
Teruya

(10) Patent No.: US 10,521,173 B2
(45) Date of Patent: Dec. 31, 2019

(54) PRINT CONTROL APPARATUS, PRINT SYSTEM, AND NON-TRANSITORY RECORDING MEDIUM FOR IDENTIFYING AT LEAST ONE OF A PLURALITY OF PRINTERS CAPABLE OF EXECUTING A PRINT JOB

(71) Applicant: Akira Teruya, Kanagawa (JP)

(72) Inventor: Akira Teruya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/127,458

(22) Filed: Sep. 11, 2018

(65) Prior Publication Data

US 2019/0121588 A1 Apr. 25, 2019

(30) Foreign Application Priority Data

Oct. 23, 2017 (JP) .................................. 2017-204532

(51) Int. Cl.
*G06F 3/12* (2006.01)

(52) U.S. Cl.
CPC .......... *G06F 3/1263* (2013.01); *G06F 3/1215* (2013.01); *G06F 3/1241* (2013.01); *G06F 3/1256* (2013.01); *G06F 3/1282* (2013.01); *G06F 3/1208* (2013.01)

(58) Field of Classification Search
CPC combination set(s) only.
See application file for complete search history.

(56) References Cited

U.S. PATENT DOCUMENTS

| 8,400,680 | B2* | 3/2013 | Kikuchi | G06F 3/1204 358/1.18 |
|---|---|---|---|---|
| 8,619,335 | B2* | 12/2013 | Matsunaga | G03G 15/36 358/1.4 |
| 9,025,987 | B2* | 5/2015 | Shindo | G06F 3/1208 399/79 |
| 9,235,791 | B2* | 1/2016 | Honda | G06K 15/1822 |
| 9,372,459 | B2* | 6/2016 | Amada | G03G 15/235 |
| 2006/0188295 | A1* | 8/2006 | Kasiske | G03G 15/0121 399/182 |

(Continued)

FOREIGN PATENT DOCUMENTS

| JP | 2014-021876 | 2/2014 |
| JP | 2016-057816 | 4/2016 |

*Primary Examiner* — Dung D Tran
(74) *Attorney, Agent, or Firm* — Harness, Dickey & Pierce, P.L.C.

(57) ABSTRACT

A print control apparatus controls at least one printer including a first printing mechanism to perform a first printing process with a first paint and a second printing mechanism to perform a second printing process with a second paint. The print control apparatus includes circuitry configured to set, based on an operation performed by a user, a print order in which the first printing process and the second printing process are executed, generate a print job based on the print order, acquire device information representing relative positions of the first printing mechanism and the second printing mechanism, determine whether the print job is executable in one pass printing based on the print order and the device information, and notify the user of information indicating whether the one pass printing is executable.

18 Claims, 20 Drawing Sheets

(56) References Cited

U.S. PATENT DOCUMENTS

| | | | |
|---|---|---|---|
| 2010/0027040 A1* | 2/2010 | Kuroda | G03G 15/0173 358/1.9 |
| 2010/0079772 A1* | 4/2010 | Moody | H04N 1/128 358/1.2 |
| 2012/0176632 A1* | 7/2012 | Katano | B41J 2/2114 358/1.9 |
| 2015/0093129 A1* | 4/2015 | Mitsunobu | G03G 15/50 399/40 |
| 2015/0110507 A1* | 4/2015 | Sudo | G03G 15/041 399/40 |
| 2019/0079423 A1* | 3/2019 | Iwaki | G03G 15/05 |

* cited by examiner

FIG. 6

| PRINTER | RELATIVE POSITIONS OF PROCESS UNITS (PRINT ORDER OF REGULAR COLORS CMYK AND SPECIAL COLOR W) | PRINTING METHOD | PRINT RESULT | RESTRICTION |
|---|---|---|---|---|
| FIRST PRINTER 2A | K→C→M→Y→W | ONE PASS PRINTING | SPECIAL COLOR LATER PRINTING | UNABLE TO EXECUTE SPECIAL COLOR FIRST PRINTING AS ONE PASS PRINTING |
| | | TWO PASS PRINTING<br><br>FIRST JOB: W<br>SECOND JOB: CMYK | SPECIAL COLOR FIRST PRINTING | INVOLVES RESETTING OF SHEET AFTER FIRST JOB |
| SECOND PRINTER 2B | W→C→M→Y→K | ONE PASS PRINTING | SPECIAL COLOR FIRST PRINTING | UNABLE TO EXECUTE CMYK FIRST PRINTING AS ONE PASS PRINTING |
| | | TWO PASS PRINTING<br><br>FIRST JOB: CMYK<br>SECOND JOB: W | SPECIAL COLOR LATER PRINTING | INVOLVES RESETTING OF SHEET AFTER FIRST JOB |

| DEVICE | FIRST PRINTER 2A |
|---|---|
| MODEL NAME | MODEL A |
| STAPLING | SADDLE STITCHING |
| PUNCHING | 2 HOLES |
| AVAILABLE TONER TYPE | CMYK,W |
| PROCESS UNIT 1 | K |
| PROCESS UNIT 2 | C |
| PROCESS UNIT 3 | M |
| PROCESS UNIT 4 | Y |
| PROCESS UNIT 5 | W |
| ⋮ | ⋮ |

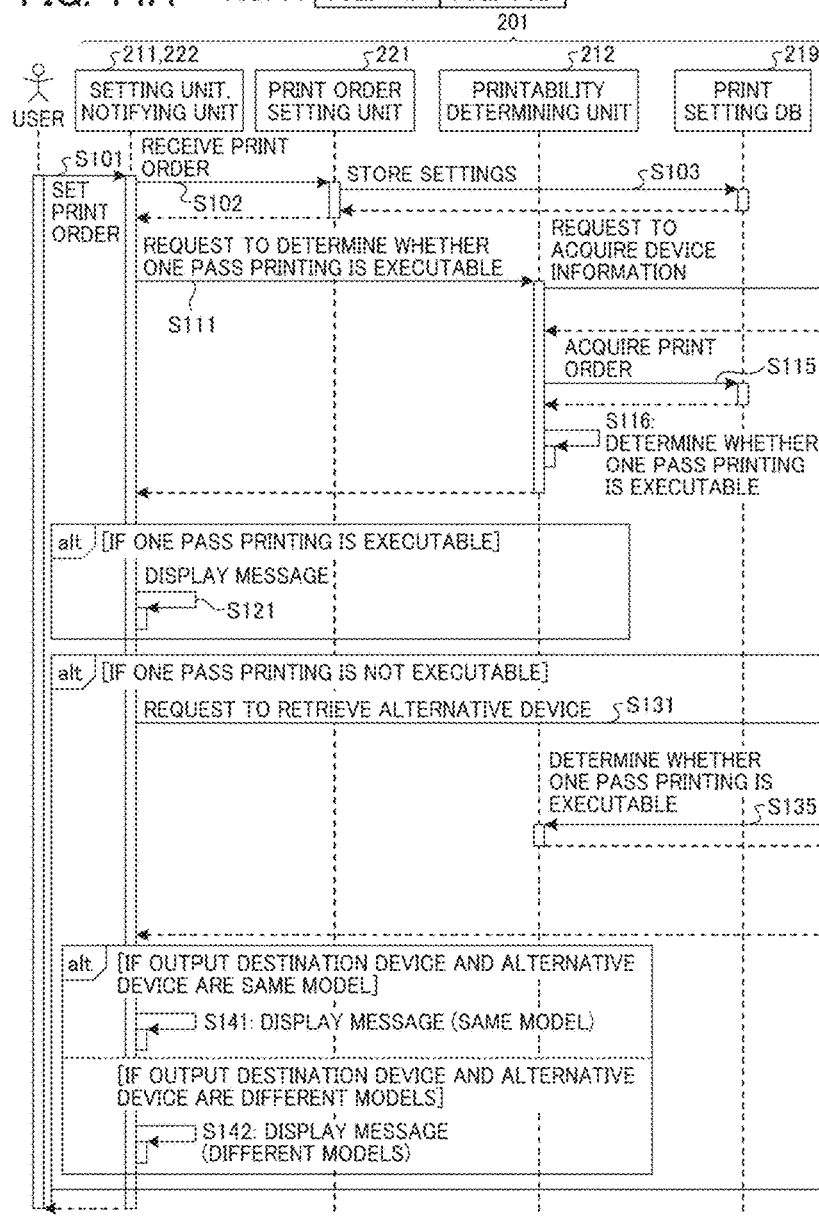

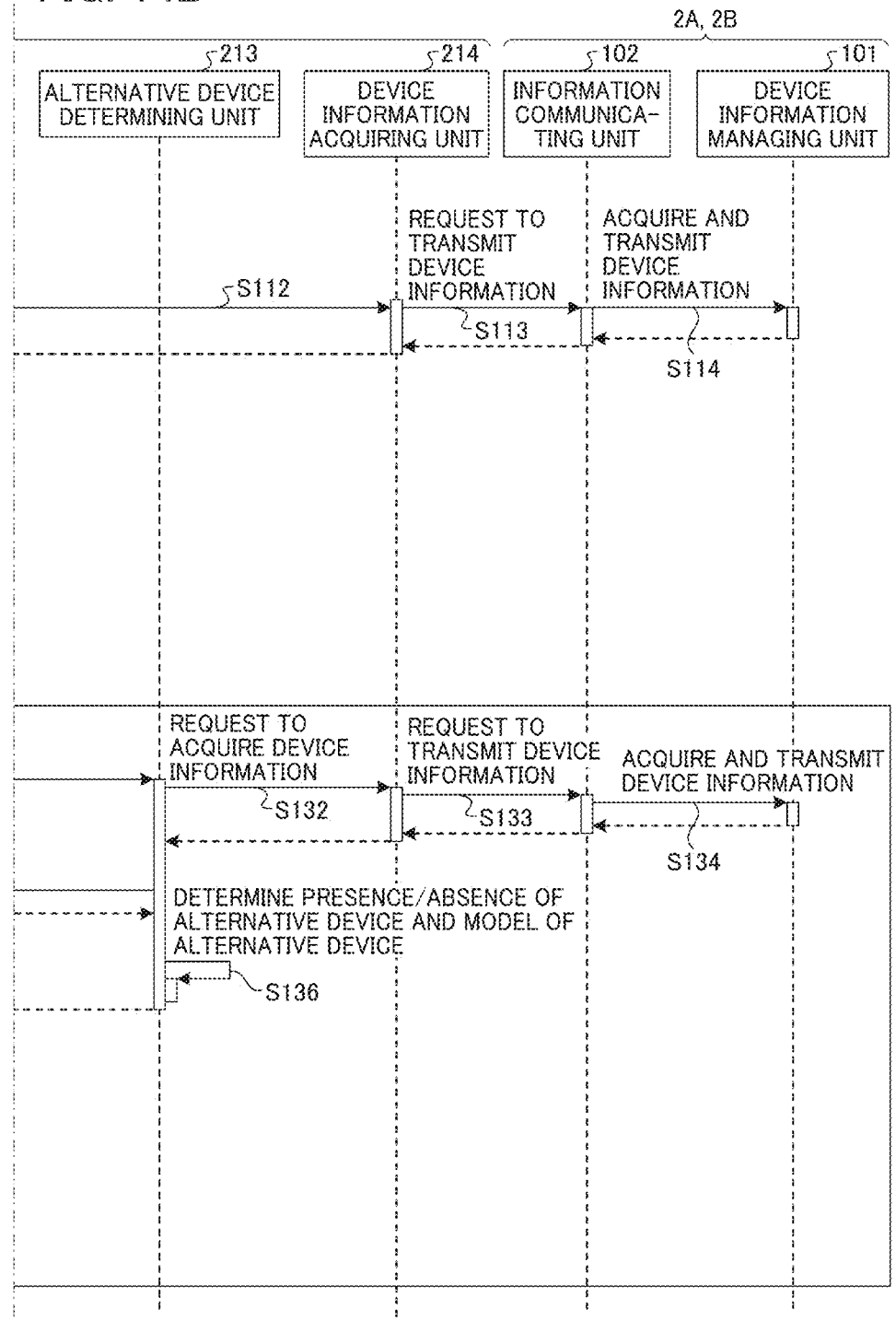

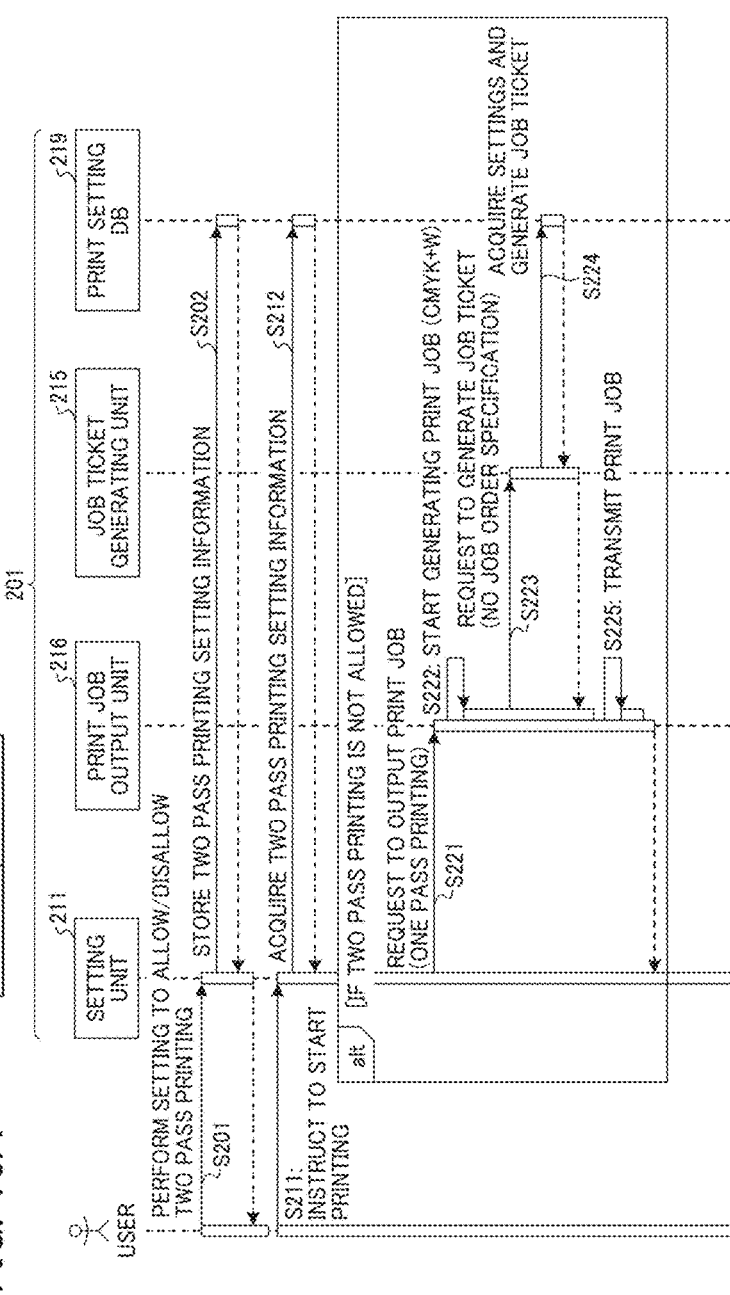
FIG. 16A  FIG. 16  | FIG. 16A | FIG. 16B |

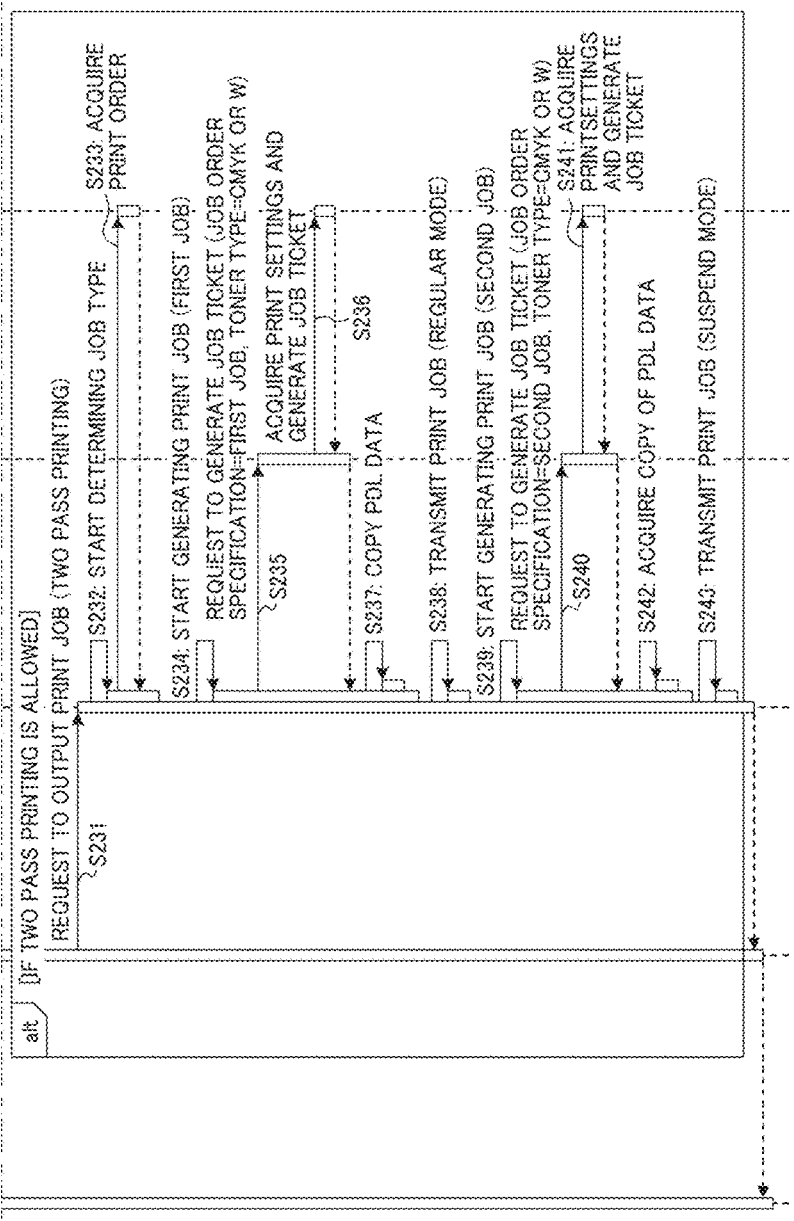

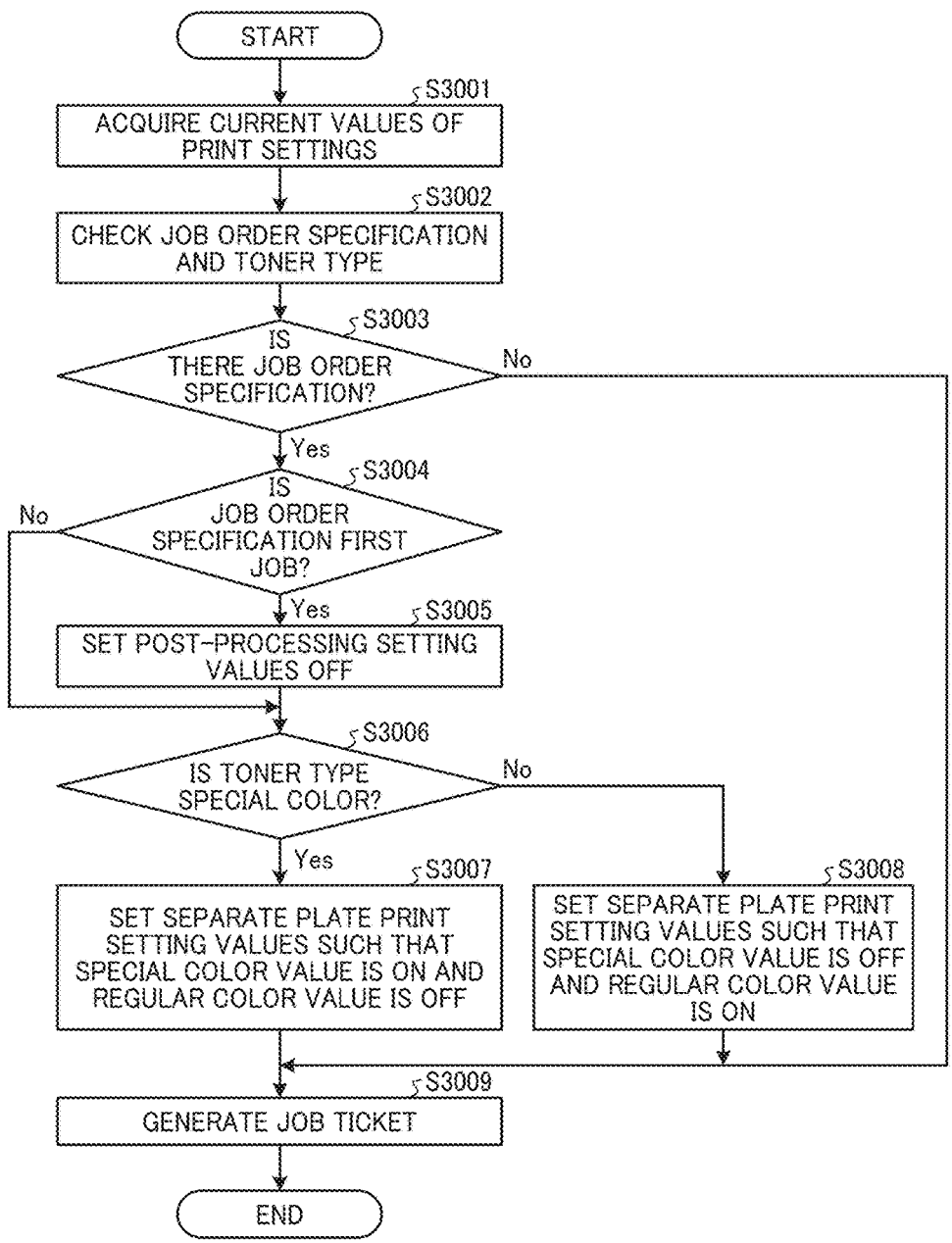

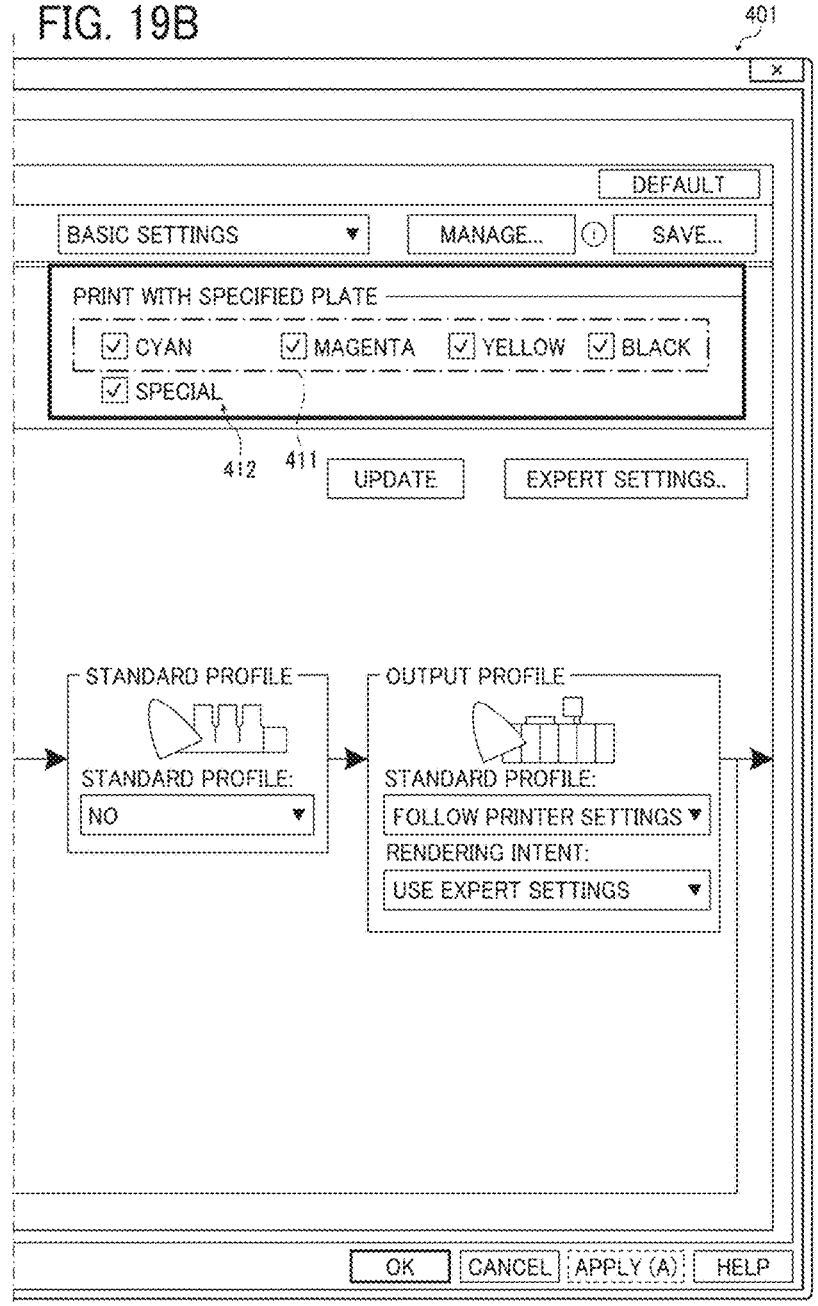

FIG. 20

| SEPARATE PLATE PRINT SETTING ITEM | PARAMETER | EFFECT |
|---|---|---|
| C (CYAN) | ON | PRINT C |
| | OFF | NOT TO PRINT C |
| M (MAGENTA) | ON | PRINT M |
| | OFF | NOT TO PRINT M |
| Y (YELLOW) | ON | PRINT Y |
| | OFF | NOT TO PRINT Y |
| K (BLACK) | ON | PRINT K |
| | OFF | NOT TO PRINT K |
| W (SPECIAL) | ON | PRINT SPECIAL COLOR |
| | OFF | NOT TO PRINT SPECIAL COLOR |

PRINT CONTROL APPARATUS, PRINT SYSTEM, AND NON-TRANSITORY RECORDING MEDIUM FOR IDENTIFYING AT LEAST ONE OF A PLURALITY OF PRINTERS CAPABLE OF EXECUTING A PRINT JOB

CROSS-REFERENCE TO RELATED APPLICATION

This patent application is based on and claims priority pursuant to 35 U.S.C. § 119(a) to Japanese Patent Application No. 2017-204532 filed on Oct. 23, 2017, in the Japan Patent Office, the entire disclosure of which is hereby incorporated by reference herein.

BACKGROUND

Technical Field

The present invention relates to a print control apparatus, a print system, and a non-transitory recording medium.

Description of the Related Art

Formation of a particularly high-quality image is demanded in some cases in the print-on-demand (POD) market, for example. To respond to such a demand, some printers include a regular process unit that performs regular printing with regular paints such as paints of cyan (C), magenta (M), yellow (Y), and key plate (K) colors and a special color process unit that performs special color printing with special color paints such as paints of transparent, white, and gloss colors. Such printers are capable of performing special color first printing of printing the special color paints as a primer for the regular paints and special color later printing of printing the special color paints to form a coating layer for the regular paints, thereby forming a high-quality image with properties of the special color paints.

For example, there is a system including a printer that performs printing with CMYK toners and a printer that performs printing with special color toners (i.e., special toners), in which one of the printers analyzes print data, determines whether processing by the other printer is necessary, and if the processing by the other printer is necessary, determines which one of the printers should execute processing first, and performs processes such as transfer and storage of the print data to allow the printer determined as the first printer to perform a printing process first.

SUMMARY

In one embodiment of this invention, there is provided an improved print control apparatus that controls at least one printer including a first printing mechanism to perform a first printing process with a first paint and a second printing mechanism to perform a second printing process with a second paint. The print control apparatus includes circuitry configured to set, based on an operation performed by a user, a print order in which the first printing process and the second printing process are executed, generate a print job based on the print order, acquire device information representing relative positions of the first printing mechanism and the second printing mechanism, determine whether the print job is executable in one pass printing based on the print order and the device information, and notify the user of information indicating whether the one pass printing is executable.

In one embodiment of this invention, there is provided an improved print system that includes, for example, at least one printer and a print control apparatus. The at least one printer includes a first printing mechanism to perform a first printing process with a first paint and a second printing mechanism to perform a second printing process with a second paint. The print control apparatus is connected to the at least one printer via a network, and includes circuitry configured to set, based on an operation performed by a user, a print order in which the first printing process and the second printing process are executed, generate a print job based on the print order, acquire device information representing relative positions of the first printing mechanism and the second printing mechanism, determine whether the print job is executable in one pass printing based on the print order and the device information, and notify the user of information indicating whether the one pass printing is executable.

In one embodiment of this invention, there is provided a non-transitory recording medium storing a plurality of instructions which, when executed by one or more processors that control at least one printer including a first printing mechanism to perform a first printing process with a first paint and a second printing mechanism to perform a second printing process with a second paint, cause the processors to perform a print controlling method. The print controlling method includes setting, based on an operation performed by a user, a print order in which the first printing process and the second printing process are executed, generating a print job based on the print order, acquiring device information representing relative positions of the first printing mechanism and the second printing mechanism, determining whether the print job is executable in one pass printing based on the print order and the device information, and notifying the user of information indicating whether the one pass printing is executable.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is a table illustrating the correspondence between relative positions of process units in the first printer and the second printer according to the embodiment and print results;

FIGS. 14A and 14B are a sequence diagram illustrating processes up to a step at which a printer driver of the information processing apparatus according to the embodiment displays a message as to availability of one pass printing;

FIGS. 16A and 16B are a sequence diagram illustrating processes up to a step at which the printer driver according to the embodiment transmits a print job to one of the first printer and the second printer;

FIG. 18 is a flowchart illustrating a job ticket generation process performed by a job ticket generating unit of the printer driver according to the embodiment;

FIGS. 19A and 19B are a diagram illustrating a separate plate print setting screen according to the embodiment; and FIG. 20 is a table illustrating a data structure of separate plate print setting information according to the embodiment.

Figure 1:
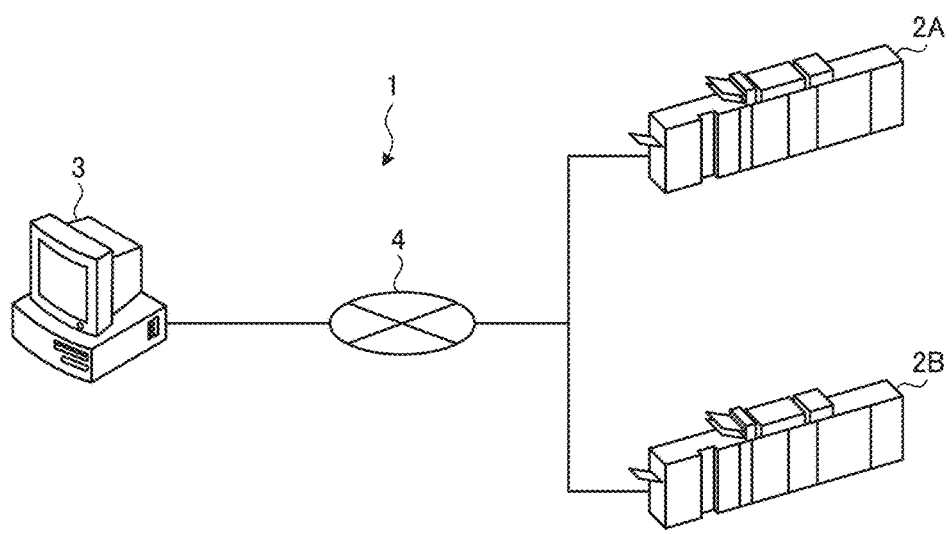
FIG. 1 is a diagram illustrating a general arrangement of a print system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

When executing printing with the regular paints and the special color paints, a user sets a print order, i.e., the order of executing the regular printing and the special color printing (e.g., the special color first printing or the special color later printing) to obtain desired effects of the special color paints. When using a printer including both the regular process unit that performs the regular printing and the special color process unit that performs the special color printing, the user adjusts settings depending on the relative positions of the regular process unit and the special color process unit. If the special color process unit is disposed downstream of the regular process unit in a sheet transport direction, for example, it is possible to set one pass printing in the special color later printing. In the special color first printing, however, the user sets two pass printing. Herein, the one pass printing refers to a printing method that completes printing with one printing process, and the two pass printing refers to a printing method that completes printing by performing two printing processes on the same sheet. That is, when executing the special color first printing with the above-configured printer, the user adjusts the settings such that the special color printing is performed by the special color process unit in the first pass, and that the regular printing is performed by the regular process unit in the second pass.

In many existing systems, however, the relative positions of the regular process unit and the special color process unit in the printer are unknown to the user, preventing the user from performing appropriate settings. For example, to execute the special color first printing with the printer in which the special color process unit is disposed downstream of the regular process unit in the sheet transport direction, the two pass printing should be set, as described above. If the user does not correctly understand the relative positions of the two types of process units, however, the user may set the one pass printing. Such a setting error results in a print error, providing a print unintended by the user and failing to provide the desired effects of the special color paints.

A print control apparatus, a print system, and a non-transitory recording medium according to an embodiment of the present invention will be described in detail below with reference to the accompanying drawings. The print control apparatus, the print system, and the non-transitory recording medium according to the following embodiment prevent a print error in a printer that performs overprinting with plural types of paints.

FIG. 1 is a diagram illustrating a general arrangement of a print system 1 according to the embodiment. The print system 1 includes a first printer 2A, a second printer 2B, an information processing apparatus 3 (i.e., a print control apparatus), and a network 4. The print system 1 according to the present example aims to form an image of relatively high quality with plural types of toners (i.e., paints).

Each of the first printer 2A and the second printer 2B is an apparatus that forms an image on a sheet (i.e., medium) based on a print job transmitted from the information processing apparatus 3. The first printer 2A and the second printer 2B according to the present example are both laser printers that form an image on a sheet with toner. However, the form of the first printer 2A and the second printer 2B is not limited thereto. For example, inkjet printers may be employed as the first printer 2A and the second printer 2B.

The information processing apparatus 3 is a computer that performs a process for controlling the first printer 2A and the second printer 2B based on an operation performed by a user. For example, the information processing apparatus 3 may be a personal computer (PC), a tablet terminal, or a smartphone. The information processing apparatus 3 generates the print job based on information such as image data to be printed and settings set by the user, and transmits the generated print job to the first printer 2A or the second printer 2B.

The network 4 is a computer network enabling communication between the first printer 2A, the second printer 2B, and the information processing apparatus 3. The network 4 may be a local area network (LAN) built with a communication tool conforming to a standard such as Ethernet (registered trademark) or Wi-Fi (registered trademark). Further, the network 4 may communicate with the information processing apparatus 3 on the Internet via a router, for example.

Figure 2:
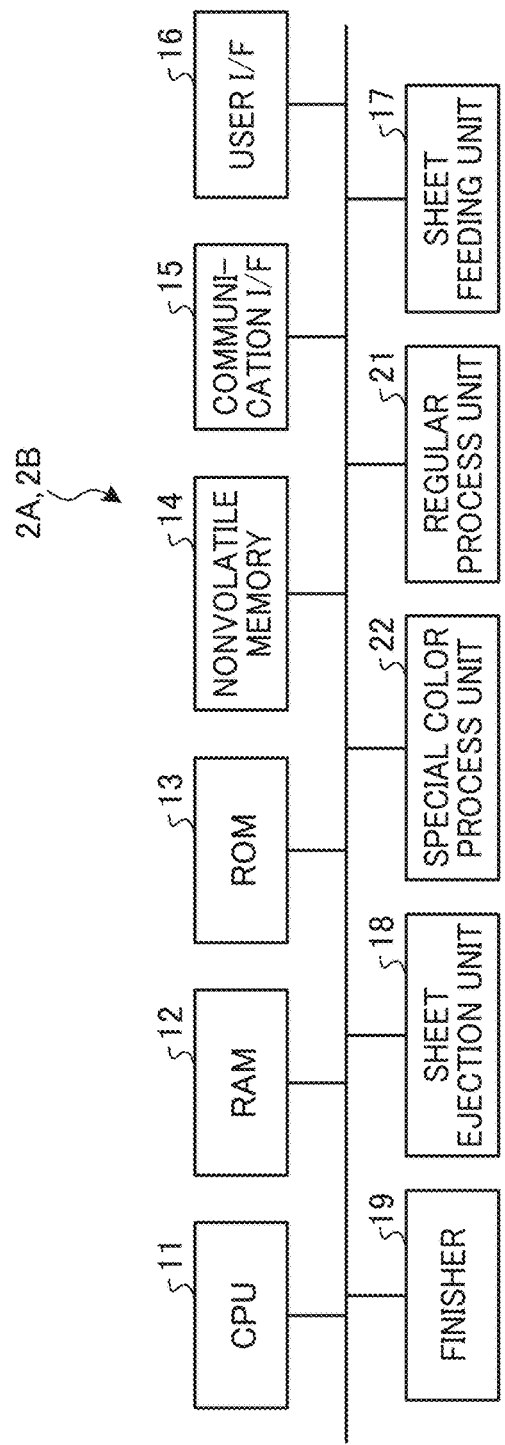
FIG. 2 is a block diagram illustrating a hardware configuration of each of a first printer and a second printer of the print system according to the embodiment.

FIG. 2 is a block diagram illustrating a hardware configuration of each of the first printer 2A and the second printer 2B according to the embodiment. Each of the first printer 2A and the second printer 2B includes a central processing unit (CPU) 11, a random access memory (RAM) 12, a read only memory (ROM) 13, a nonvolatile memory 14, a communication interface (I/F) 15, a user I/F 16, a sheet feeding unit 17, a sheet ejection unit 18, a finisher 19 (i.e., a post-processing mechanism), a regular process unit 21 (i.e., a first printing mechanism), and a special color process unit 22 (i.e., a second printing mechanism).

The CPU 11 is at least one integrated circuit that performs a variety of arithmetic processes in accordance with programs stored in the ROM 13 by using the RAM 12 as a working area. The nonvolatile memory 14 is a semiconductor memory element that holds data even after the first printer 2A or the second printer 2B is powered off. The nonvolatile memory 14 stores a variety of data for performing the printing process. The communication I/F 15 is a device enabling the first printer 2A or the second printer 2B to communicate with another apparatus such as the information processing apparatus 3 via the network 4. The user I/F 16 is a device that receives an operation performed by the user and provides a variety of information to the user. The user I/F 16 includes a display, a touch panel, a keyboard, and a speaker, for example.

The sheet feeding unit 17 is a mechanism that feeds a sheet into the first printer 2A or the second printer 2B to form an image thereon. The sheet feeding unit 17 includes devices such as a sheet feeding tray, a transport belt, and drive rollers. The sheet ejection unit 18 is a mechanism that ejects the printed sheet to the outside of the first printer 2A or the second printer 2B. The sheet ejection unit 18 includes devices such as a sheet ejection tray, a transport belt, and drive rollers. The finisher 19 is a mechanism that performs post-processing on the printed sheet, and has functions such as stapling and sorting, for example.

The regular process unit 21 is a mechanism that performs the regular printing (i.e., a first printing process) with a regular color toner (i.e., a first paint). The regular color toner may include toners used to perform color printing, such as cyan (C), magenta (M), yellow (Y), and key plate (K) toners (i.e., CMYK toners) or red (R), green (G), and blue (B) toners (i.e., RGB toners), for example. However, the regular color toner is not limited thereto, and may include a toner used to perform monochrome printing, such as a black toner, for example. The regular color toner to be used is determined as appropriate in accordance with the usage of the regular process unit 21. In the present embodiment, the CMYK toners are used as the regular color toner.

The special color process unit 22 is a mechanism that performs the special color printing (i.e., a second printing process) with a special color toner (i.e., a second paint). The special color toner is different from the regular color toner, and may include toners of transparent, white, and gloss (e.g., gold or silver) colors, for example. The special color toner is used to improve the quality or image quality of a print. For example, the special color toner forms a base for the regular color toner, or forms a coating layer over the regular color toner. The special color toner to be used is determined as appropriate in accordance with the usage of the special color process unit 22. In the present embodiment, a white (W) toner is used as the special color toner.

Figure 3:
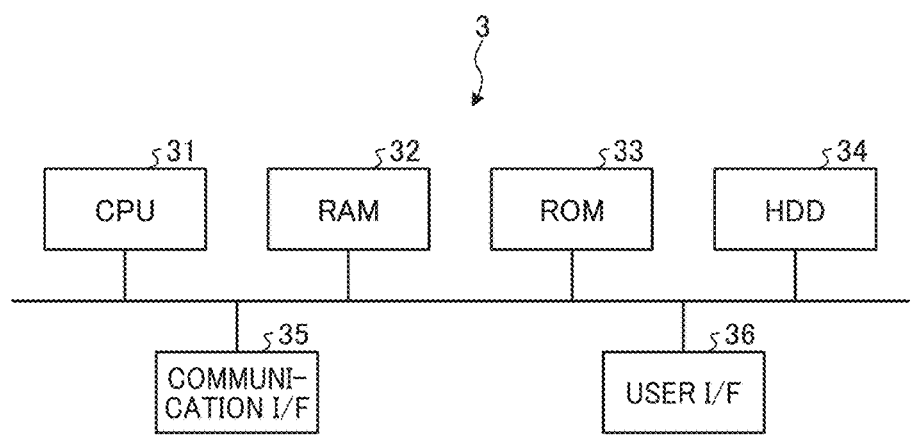
FIG. 3 is a block diagram illustrating a hardware configuration of an information processing apparatus of the print system according to the embodiment.

FIG. 3 is a block diagram illustrating a hardware configuration of the information processing apparatus 3 according to the embodiment. The information processing apparatus 3 includes a CPU 31, a RAM 32, a ROM 33, a hard disk drive (HDD) 34, a communication I/F 35, and a user I/F 36. The CPU 31 is at least one integrated circuit that performs a variety of arithmetic processes in accordance with programs stored in the ROM 33 or the HDD 34 by using the RAM 32 as a working area. The HDD 34 is a memory device functioning as a nonvolatile memory, and stores a variety of data for performing the printing process. The communication I/F 35 is a device enabling the information processing apparatus 3 to communicate with another apparatus such as the first printer 2A or the second printer 2B via the network 4. The user I/F 36 is a device that receives an operation performed by the user and provides a variety of information to the user. The user I/F 36 includes a display, a keyboard, a touch panel, a pointing device, and a speaker, for example.

Figure 4:
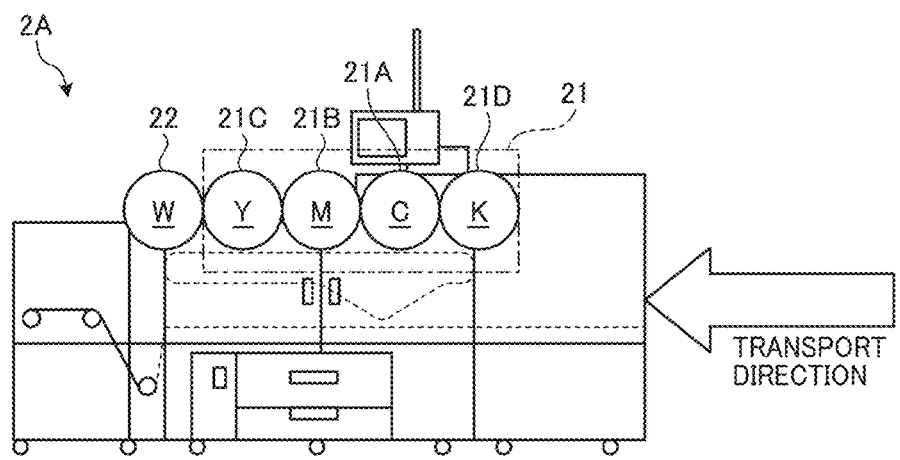
FIG. 4 is a schematic diagram illustrating an internal structure of the first printer according to the embodiment.
Figure 5:
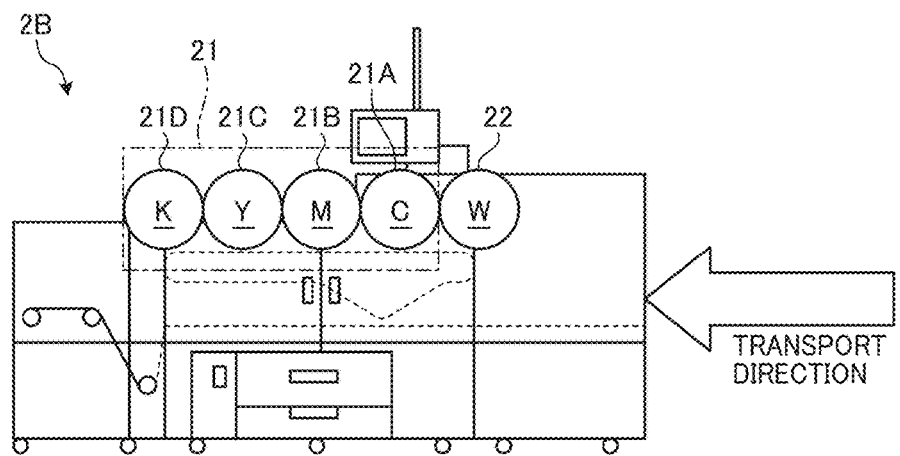
FIG. 5 is a schematic diagram illustrating an internal structure of the second printer according to the embodiment.

FIG. 4 is a schematic diagram illustrating an internal structure of the first printer 2A according to the embodiment. FIG. 5 is a schematic diagram illustrating an internal structure of the second printer 2B according to the embodiment. Each of the first printer 2A and the second printer 2B includes the regular process unit 21 and the special color process unit 22. The regular process unit 21 according to the present example includes a C process unit 21A that performs a printing process with the cyan (C) toner, an M process unit 21B that performs a printing process with the magenta (M) toner, a Y process unit 21C that performs a printing process with the yellow (Y) toner, and a K process unit 21D that performs a printing process with the key plate (K) toner. The special color process unit 22 according to the present example is a process unit that performs a printing process with the white (W) toner.

In the first printer 2A, the special color process unit 22 is disposed downstream of the regular process unit 21 in the sheet transport direction. The first printer 2A is therefore capable of performing the special color later printing, in which the special color printing follows the regular printing, as the one pass printing. However, the first printer 2A performs the special color first printing, in which the special color printing precedes the regular printing, as multiple pass printing (i.e., at least two pass printing). In the second printer 2B, on the other hand, the special color process unit 22 is disposed upstream of the regular process unit 21 in the sheet transport direction. The second printer 2B is therefore capable of performing the special color first printing as the one pass printing. However, the second printer 2B performs the special color later printing as the multiple pass printing (i.e., at least two pass printing). Herein, the one pass printing refers to a printing method that completes printing with one printing process. In the present embodiment, the one pass printing is a printing method that generates an intended print by passing a sheet through the first printer 2A or the second printer 2B once. The multiple pass printing refers to a printing method that completes printing by performing a plurality of printing processes on the same sheet. In the present embodiment, the multiple pass printing is a printing method that generates an intended print by passing a sheet through the first printer 2A or the second printer 2B a plurality of times.

FIG. 6 is a table illustrating the correspondence between relative positions of the regular process unit 21 and the special color process unit 22 in the first printer 2A and the second printer 2B according to the embodiment and print results.

In the first printer 2A, the regular process unit 21 (i.e., the CMYK process units 21A to 21D corresponding to the CMYK toners) and the special color process unit 22 corresponding to the W toner are disposed in the order of K, C, M, Y, and W along the sheet transport direction, as illustrated in FIGS. 4 and 6. When the one pass printing is set as the printing method for the thus-configured first printer 2A, a print subjected to the special color later printing is naturally obtained as the print result. The first printer 2A is thus restricted in being unable to perform the special color first printing as the one pass printing. If the two pass printing is set as the printing method for the first printer 2A to perform printing with the W toner in the first job and perform printing with the CMYK toners in the second job, the first printer 2A is capable of performing the special color first printing. Such two pass printing, however, involves resetting of the sheet in the sheet feeding unit 17 after the first job (i.e., after the special color printing).

In the second printer 2B, the regular process unit 21 (i.e., the CMYK process units 21A to 21D) and the special color process unit 22 corresponding to the W toner are disposed in the order of W, C, M, Y, and K along the sheet transport direction, as illustrated in FIGS. 5 and 6. When the one pass printing is set as the printing method for the thus-configured second printer 2B, a print subjected to the special color first printing is naturally obtained as the print result. The second printer 2B is thus restricted in being unable to perform the special color later printing, i.e., CMYK first printing, as the one pass printing. If the two pass printing is set as the printing method for the second printer 2B to perform printing with the CMYK toners in the first job and perform printing with the W toner in the second job, the second printer 2B is capable of performing the special color later printing. Such two pass printing, however, involves resetting of the sheet in the sheet feeding unit 17 after the first job (i.e., after the regular printing with the CMYK toners).

Figures 7, 8:
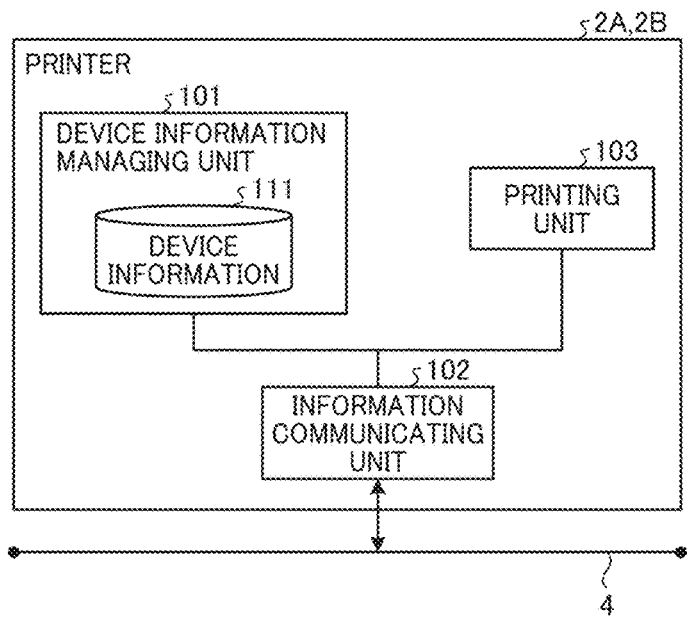
FIG. 7 is a block diagram illustrating a functional configuration of each of the first printer and the second printer according to the embodiment.
FIG. 8 is a table illustrating a data structure of device information of the first printer according to the embodiment.

FIG. 7 is a block diagram illustrating a functional configuration of each of the first printer 2A and the second printer 2B according to the embodiment. Each of the first printer 2A and the second printer 2B includes a device information managing unit 101, an information communicating unit 102, and a printing unit 103.

The device information managing unit 101 stores device information 111. The device information 111 represents features of the corresponding printer (i.e., the first printer 2A or the second printer 2B), and includes the relative positions of the regular process unit 21 (i.e., the CMYK process units 21A to 21D) and the special color process unit 22. The device information 111 may include information other than the relative positions. The device information managing unit 101 is configured by cooperation of devices such as the CPU 11, the ROM 13, and the nonvolatile memory 14.

Figures 9, 10:
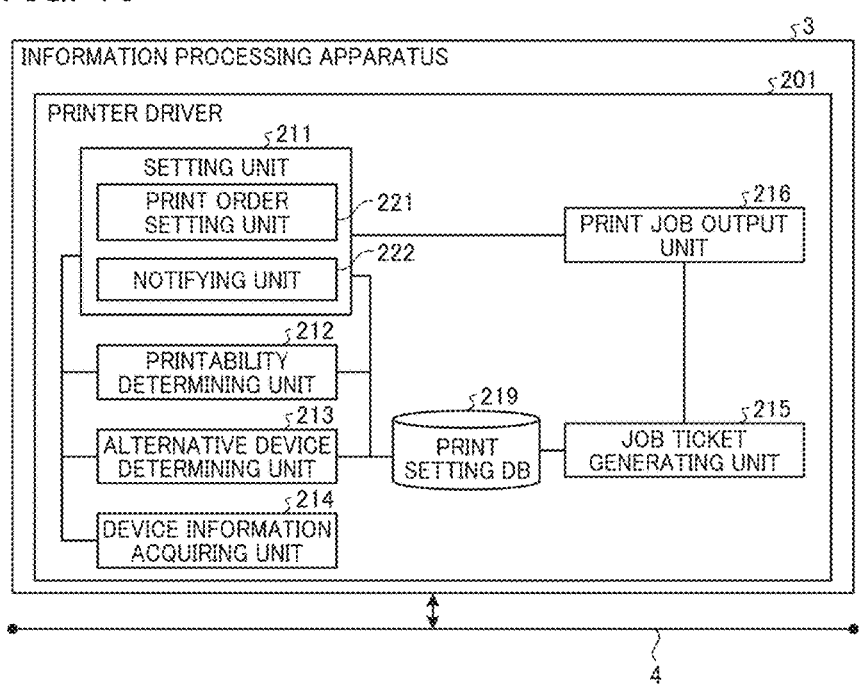
FIG. 9 is a table illustrating a data structure of device information of the second printer according to the embodiment.
FIG. 10 is a block diagram illustrating a functional configuration of the information processing apparatus according to the embodiment.

FIG. 8 is a table illustrating a data structure of the device information 111 of the first printer 2A according to the embodiment. FIG. 9 is a table illustrating a data structure of the device information 111 of the second printer 2B according to the embodiment. The device information 111 according to the present example includes a model name field 121 representing the model name of the first printer 2A or the second printer 2B, a finisher function field 122 representing the functions of the finisher 19 (e.g., stapling and punching), a toner type field 123 representing the available toner types, a relative position field 124 representing the arrangement order of process units (e.g., process units 1 to 5), and an input information filed 125 representing information input by the user (e.g., the type of sheet to be used).

Suffix numbers 1 to 5 in the relative position field 124 are process unit numbers representing the arrangement order of the CMYK process units 21A to 21D and the special color process unit 22. The smaller the suffix number is, the more upstream in the sheet transport direction the process unit corresponding to the suffix number is. That is, the relative position field 124 in the device information 111 of the first printer 2A illustrated in FIG. 8 indicates that the regular process unit 21 that performs the printing process with the CMYK toners (i.e., the K process unit 21D, the C process unit 21A, the M process unit 21B, and the Y process unit 21C) is disposed upstream of the special color process unit 22 that performs the printing process with the W toner. The relative position field 124 in the device information 111 of the second printer 2B illustrated in FIG. 9 indicates that the special color process unit 22 that performs the printing process with the W toner is disposed upstream of the regular process unit 21 that performs the printing process with the CMYK toners (i.e., the C process unit 21A, the M process unit 21B, the Y process unit 21C, and the K process unit 21D).

The information communicating unit 102 transmits and receives a variety of information for use in the printing process to and from the information processing apparatus 3 via the network 4. The information communicating unit 102 transmits the device information 111 to the information processing apparatus 3 in response to a request from the information processing apparatus 3, and receives the print job transmitted from the information processing apparatus 3. The information communicating unit 102 is configured by cooperation of devices such as the CPU 11 and the communication I/F 15.

The printing unit 103 performs the printing process based on the print job received by the information communicating unit 102. The printing unit 103 is configured by cooperation of devices such as the CPU 11, the sheet feeding unit 17, the regular process unit 21, the special color process unit 22, the sheet ejection unit 18, and the finisher 19.

FIG. 10 is a block diagram illustrating a functional configuration of the information processing apparatus 3 according to the embodiment. The information processing apparatus 3 includes a printer driver 201 that performs a variety of processes related to printing. The printer driver 201 includes a setting unit 211, a printability determining unit 212, an alternative device determining unit 213 (i.e., a retrieving unit), a device information acquiring unit 214, a job ticket generating unit 215, a print job output unit 216, and a print setting database (DB) 219.

The setting unit 211 performs a variety of settings related to printing based on an operation performed by the user. The setting unit 211 receives the operation by the user via devices such as the display and the keyboard of the user I/F 36, and generates setting information based on the operation. The setting information includes, for example, the information of the first printer 2A or the second printer 2B specified as an output destination device and the information of the print order described later. As well as these information items, the setting information may also include the sheet size, the page orientation, the number of copies, the scale size, the margin, and the separate plate colors, for example. The setting information is stored in the print setting DB 219. The setting unit 211 is configured by cooperation of devices such as the CPU 31 and the user I/F 36. The print setting DB 219 is configured by cooperation of devices such as the CPU 31, the HDD 34, and the RAM 32, which is a nonvolatile RAM.

The setting unit 211 includes a print order setting unit 221. Based on the operation by the user, the print order setting unit 221 sets the print order, i.e., the execution order of the regular printing by the regular process unit 21 (i.e., the printing process with the CMYK toners) and the special color printing by the special color process unit 22 (i.e., the printing process with the W toner). For example, the print order is set as the special color first printing that performs printing with the special color before the printing with the regular colors or the special color later printing that performs printing with the special color after the printing with the regular colors. The setting unit 211 generates the setting information including the information of the set print order.

The device information acquiring unit 214 acquires the device information 111 of the first printer 2A and the second printer 2B. For example, the device information acquiring unit 214 transmits a request signal to the first printer 2A and the second printer 2B, and receives the device information 111 transmitted from the first printer 2A and the second printer 2B as a response to the request signal. The device information acquiring unit 214 is configured by cooperation of devices such as the CPU 31 and the communication I/F 35. The method of acquitting the device information 111 is not limited to receiving the device information 111 from the first printer 2A and the second printer 2B. For example, the device information 111 may previously be stored in a memory device of the information processing apparatus 3 (e.g., the ROM 33 or the HUD 34) or an appropriate memory device connected to the network 4, and may be read when necessary.

Based on the print order set by the print order setting unit 221 and the device information 111 acquired by the device information acquiring unit 214, the printability determining unit 212 determines whether the print job in the set print order is executable in the one pass printing. For example, if the user sets the special color first printing with the first printer 2A, the printability determining unit 212 determines that the print job in the set print order is not executable in the one pass printing. This is because the special color process unit 22 is disposed downstream of the regular process unit 21 in the sheet transport direction in the first printer 2A. The printability determining unit 212 is configured by cooperation of devices such as the CPU 31 and the RAM 32.

Based on the print order set by the print order setting unit 221 and the device information 111 of each of the first printer 2A and the second printer 2B connected to the network 4, the alternative device determining unit 213 determines which one of the first printer 2A and the second printer 2B is capable of executing the print job in the set print order in the one pass printing. For example, if the user sets the special color first printing with the first printer 2A, the alternative device determining unit 213 determines that the alternative device capable of executing the print job in the set print order in the one pass printing is the second printer 2B. This is because the special color process unit 22 is disposed upstream of the regular process unit 21 in the sheet transport direction in the second printer 2B. The alternative device determining unit 213 is configured by cooperation of devices such as the CPU 31 and the RAM 32.

The setting unit 211 further includes a notifying unit 222. The notifying unit 222 notifies the user of the above-described determination results of the printability determining unit 212 and the alternative device determining unit 213. That is, in the print settings by the user, the notifying unit 222 according to the embodiment provides the user with information such as the information as to whether the print job in the set print order is executable in the one pass printing, and if the print job in the set print order is not executable in the one pass printing, the information of the alternative device capable of performing the print job in the set print order in the one pass printing. The notifying unit 222 may provide the user with such information via a graphical user interface (GUI) displayed on the display of the user I/F 36 of the information processing apparatus 3, for example. This configuration enables the user to perform appropriate settings with reference to the information provided by the notifying unit 222. The notifying unit 222 is configured by cooperation of devices such as the CPU 31 and the user I/F 36.

The job ticket generating unit 215 generates a job ticket representing details of the print settings set by the setting unit 211. The job ticket generating unit 215 is configured by cooperation of devices such as the CPU 31 and the RAM 32.

When the user performs an operation of requesting to start printing, the print job output unit 216 acquires the job ticket from the job ticket generating unit 215, generates a print job including page description language (PDL) data and the job ticket added thereto, and transmits the generated print job to the first printer 2A or the second printer 2B specified as the output destination device. The print job output unit 216 is configured by cooperation of devices such as the CPU 31, the RAM 32, and the communication I/F 35.

Figure 11:
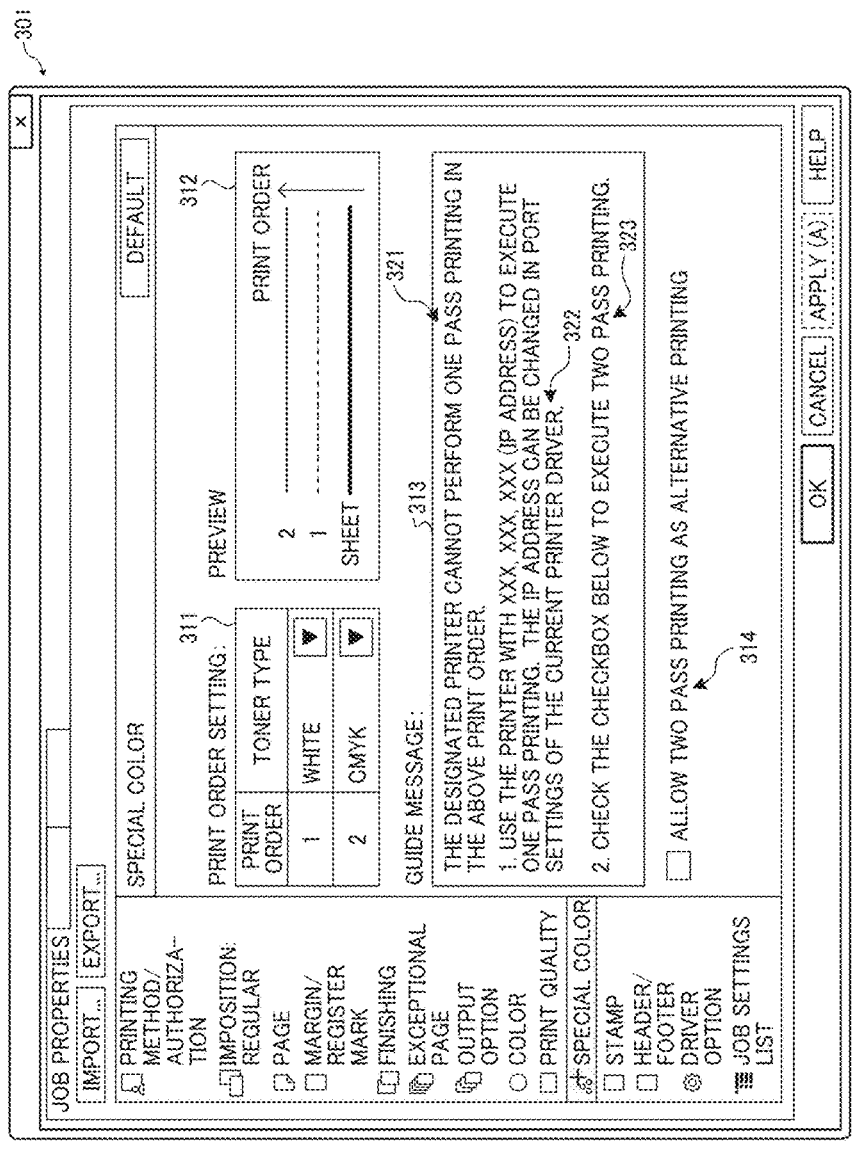
FIG. 11 is a diagram illustrating a first example of a print setting screen according to the embodiment.

FIG. 11 is a diagram illustrating a first example of a print setting screen 301 according to the embodiment. The print setting screen 301 is an example of the GUI displayed on the display of the information processing apparatus 3 when the user performs the print settings. The first example of the print setting screen 301 includes a print order setting area 311, a preview area 312, a guide message display area 313, and a multiple pass setting area 314.

The print order setting area 311 is an area for receiving the operation performed by the user to set the print order. In the present example, the user is allowed to select the toners to be used in a plurality of layers (i.e., two layers in the present example) from candidates displayed in a pull-down menu. The selectable toner candidates are determined in accordance with the types of toners set in the first printer 2A or the second printer 2B specified as the output destination device. For example, the selectable toner candidates may be the regular color toners (i.e., CMYK in the present example), the special color toner (i.e., WHITE in the present example), and NO TONER. In the example illustrated in FIG. 11, WHITE is selected as the toner type for the first layer corresponding to the number "1" in the print order, and CMYK is selected as the toner type for the second layer corresponding to the number "2" in the print order. That is, the special color first printing is set. The print order set here is stored in the print setting DB 219 as a part of the print setting information.

The preview area 312 is an area visualizing the details of the set print order. In the present example, the regular printing with the regular color toners (i.e., CMYK) is displayed as a solid line, and the special color printing with the special color toner(i.e., WHITE) is displayed as a broken line. The preview area 312 according to the present example displays an image indicating that the printing process is to be performed on the sheet in the order of the special color printing and then the regular printing. The preview area 312 is linked with the print order setting area 311, and thus the image in the preview area 312 changes with the settings input to the print order setting area 311.

The guide message display area 313 displays a message notifying whether the first printer 2A or the second printer 2B specified as the output destination device is capable of executing the one pass printing in the set print order. It is assumed in the present example that the first printer 2A is specified as the output destination device. In the first printer 2A, the special color process unit 22 is disposed downstream of the regular process unit 21 in the sheet transport direction, as illustrated in FIG. 4, for example, and the special color first printing is set as the print order in the print order setting area 311. The guide message display area 313 therefore displays a message 321 notifying that the one pass printing in the set print order is not executable. If the second printer 2B is specified as the output destination device and the special color first printing is set, the guide message display area 313 displays a message notifying that the one pass printing in the set print order is executable.

The guide message display area 313 according to the present example also displays a message 322 regarding the alternative device capable of executing the one pass printing in the set print order (i.e., the second printer 2B in the present example). Information of the alternative device is acquired based on the determination result of the alternative device determining unit 213. In the present example, the message 322 describes a method of connecting to the alternative device (i.e., switching to the Internet protocol (IP) address corresponding to the alternative device in port settings).

The guide message display area 313 according to the present example: also displays a message 323 describing a method of allowing the two pass printing. Further, the print setting screen 301 includes the multiple pass setting area 314 that receives an operation of allowing the two pass printing. If the user allows the two pass printing, the user performs an operation of checking a checkbox in the multiple pass setting area 314. Information as to whether to execute the two pass printing generated by such an operation is stored in the print setting DB 219 as a part of the print settings. The multiple pass printing is the two pass printing in the present example, but may be three or more pass printing. For example, if three or more layers are set in the print order of the print order setting area 311, the preview area 312, the guide message display area 313, and the multiple pass setting area 314 display information corresponding to the three or more pass printing. Further, if the one pass printing is executable, the multiple pass setting area 314 is not displayed.

Figure 12:
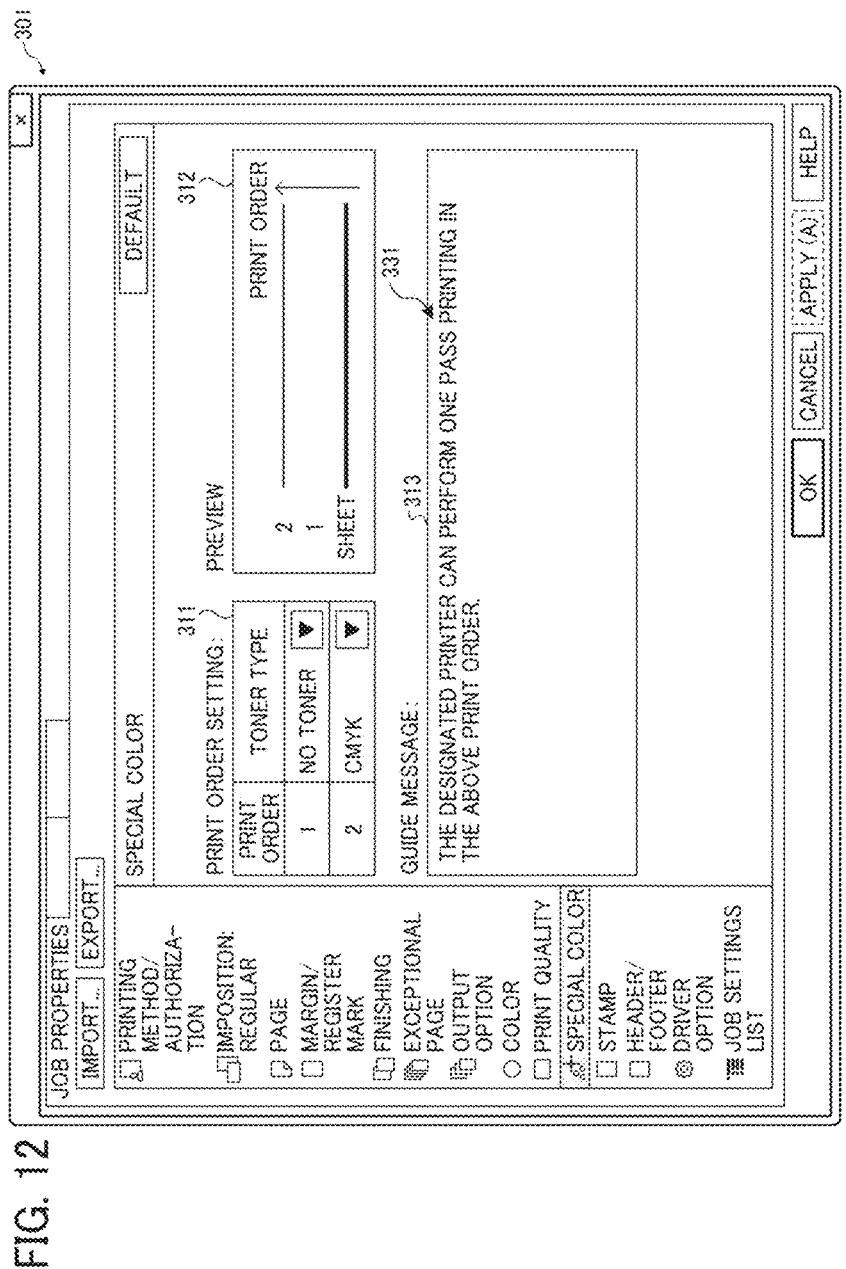
FIG. 12 is a diagram illustrating a second example of the print setting screen according to the embodiment.

FIG. 12 is a diagram illustrating a second example of the print setting screen 301 according to the embodiment. The second example of the print setting screen 301 is displayed when the settings are made not to perform the special color printing with the special color (i.e., white) toner.

In the print order setting area 311 of the second example, NO TONER is selected as the toner type for the first layer corresponding the number "1" in the print order, and CMYK is selected as the toner type for the second layer corresponding to the number "2" in the print order. Consequently, the preview area 312 displays no line in an area corresponding to the first layer, thereby visually indicating that only the regular printing with the CMYK toners is to be executed. When the special color printing is not executed, as in this example, the one pass printing is executable regardless of the arrangement position of the special color process unit 22, i.e., regardless of which one of the first printer 2A and the second printer 2B is specified as the output destination device. Therefore, the guide message display area 313 displays a message 331 notifying that the one pass printing is executable.

Figure 13:
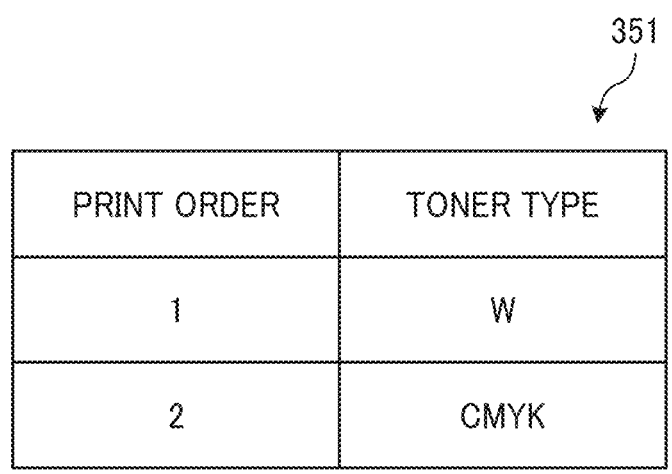
FIG. 13 is a table illustrating a data structure of information representing print order according to the embodiment.

FIG. 13 is a table illustrating a data structure of the information representing print order 351 according to the embodiment. In the data structure of the information representing the print order 351 according to the present example, the print order representing a layer on the sheet and the toner type are associated with each other. The data of the print order 351 according to the present example corresponds to the data of the above-described settings input to the print order setting unit 221.

FIGS. 14A and 14B are a sequence diagram illustrating processes up to a step at which the printer driver 201 according to the embodiment displays the message as to the availability of the one pass printing. When the user performs the operation of setting the print order via the print setting screen 301 included in the user I/F 36 of the information processing apparatus 3 (step S101), the setting unit 211 requests the print order setting unit 221 to receive the operation performed by the user (step S102). In response to the request, the print order setting unit 221 stores in the print setting DB 219 the information representing the print order 351 corresponding to the operation performed by the user (step S103).

The setting unit 211 then requests the printability determining unit 212 to determine whether the first printer 2A or the second printer 2B specified as the output destination device is capable of executing the one pass printing (step S111). In response to the request, the printability determining unit 212 requests the device information acquiring unit 214 to acquire the device information 111 of the first printer 2A or the second printer 2B specified as the output destination device (step S112). In response to the request, the device information acquiring unit 214 requests the information communicating unit 102 of the first printer 2A or the second printer 2B specified as the output destination device to transmit the device information 111 (step S113). In response to the request, the information communicating unit 102 acquires the device information 111 from the device information managing unit 101, and transmits the acquired device information 111 to the information processing apparatus 3, which has issued the request for the device information 111 (step S114).

Thereafter, the printability determining unit 212 acquires the print order 351 included in the print settings from the print setting DB 219 (step S115), and determines whether the one pass printing is executable based on the acquired print order 351 and the relative positions included in the received device information 111 (step S116).

If the one pass printing is executable, the notifying unit 222 displays, in the guide message display area 313 of the print setting screen 301, the message 331 notifying that the one pass printing is executable (step S121).

If the one pass printing is not executable, the setting unit 211 requests the alternative device determining unit 213 to retrieve the alternative device, i.e., the first printer 2A or the second printer 2B capable of executing the one pass printing (step S131). In response to the request, the alternative device determining unit 213 requests the device information acquiring unit 214 to acquire the device information 111 of both the first printer 2A and the second printer 2B connected to the network 4 (step S132). In response to the request, the device information acquiring unit 214 requests the information communicating unit 102 of each of the first printer 2A and the second printer 2B to transmit the device information 111 (step S133). In response to the request, the information communicating unit 102 acquires the device information 111 from the device information managing unit 101, and transmits the acquired device information 111 to the information processing apparatus 3, which has issued the request for the device information 111 (step S134). Thereafter, based on the print order 351 and the relative positions included in the device information 111 received from the first printer 2A and the second printer 2B, the printability determining unit 212 determines, for each of the first printer 2A and the second printer 2B, whether the one pass printing is executable (step S135). Based on the determination result of the printability determining unit 212, the alternative device determining unit 213 determines whether there is an alternative device capable of executing the one pass printing. Then, if there is an alternative device capable of executing the one pass printing, the alternative device determining unit 213 determines the model of the alternative device (step S136).

If there is an alternative device capable of executing the one pass printing, and if the alternative device and the output destination device (i.e., the first printer 2A or the second printer 2B incapable of executing the one pass printing) are the same model, the notifying unit 222 displays, in the guide message display area 313 of the print setting screen 301, the IP address of the alternative device and a message notifying that it is possible to continue to use the currently used printer driver 201 by changing the IP address in the port settings, for example (step S141).

If there is an alternative device capable of executing the one pass printing, and if the alternative device and the output destination device are different models, the notifying unit 222 displays, in the guide message display area 313 of the print setting screen 301, the IP address of the alternative device, a message notifying that it is not possible to continue to use the currently used printer driver 201 if the alternative device is used, and a message describing a method enabling the use of a new printer driver, for example (step S142).

Figure 15:
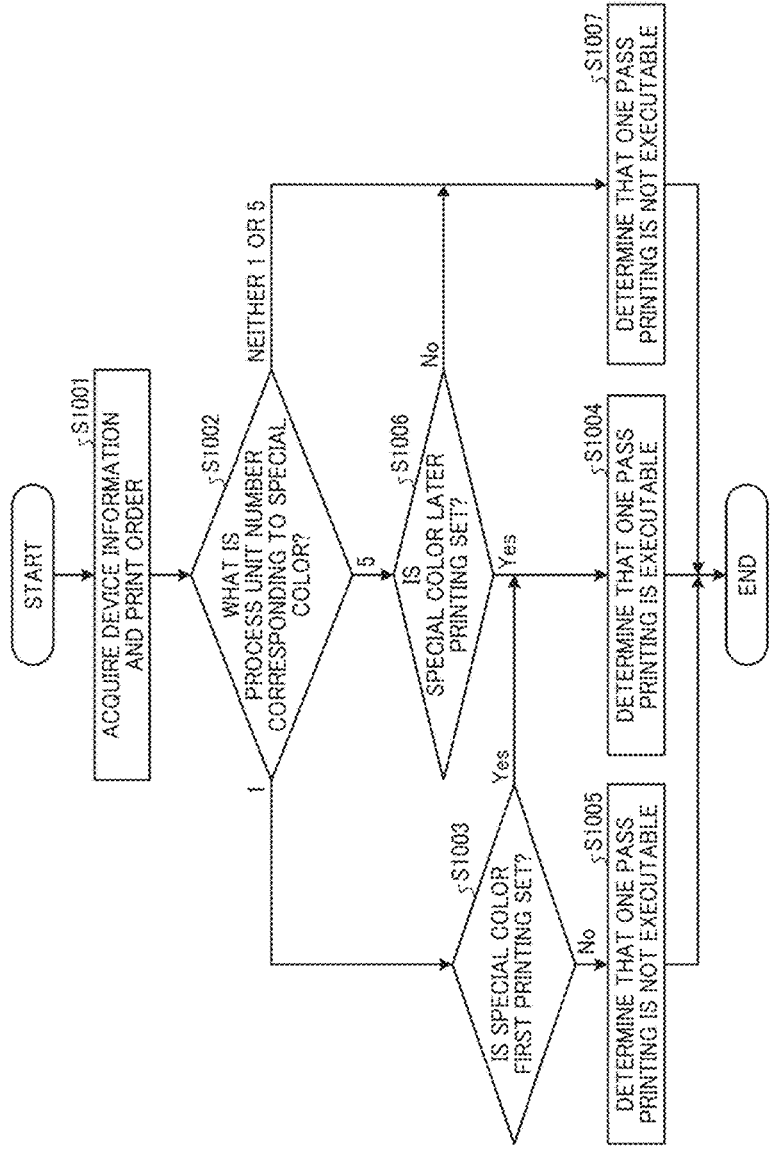
FIG. 15 is a flowchart illustrating a one pass printing availability determination process performed by a printability determining unit of the printer driver according to the embodiment.

FIG. 15 is a flowchart illustrating a one pass printing availability determination process performed by the printability determining unit 212 according to the embodiment. The printability determining unit 212 acquires the device information 111 of the first printer 2A and the second printer 2B and the print order 351 included in the setting information (step S1001). Based on the information of the relative position field 124 in the device information 111, the printability determining unit 212 checks the process unit number corresponding to the special color (step S1002).

For example, in the device information 111 of the first printer 2A illustrated in FIG. 8, the process unit number corresponding to the special color (i.e., W) is 5. In the device information 111 of the second printer 2B illustrated in FIG. 9, the process unit number corresponding to the special color is 1. The smaller the process unit number is, the more upstream in the sheet transport direction the process unit corresponding to the process unit number (i.e., one of the CMYK process units 21A to 21D of the regular process unit 21 and the special color process unit 22) is. In the embodiment, the four regular color toners (i.e., the CMYK toners) and the one special color toner (i.e., the W toner) are used, and thus process unit numbers 1 to 5 are assigned.

If the process unit number corresponding to the special color is 1 (1 at step S1002), i.e., if the special color process unit 22 is disposed most upstream, the printability determining unit 212 determines whether the special color first printing is set, i.e., whether the special color printing is set to precede the regular printing, based on the print order included in the print settings (step S1003). If the special color first printing is set (Yes at step S1003), the printability determining unit 212 determines that the one pass printing is executable (step S1004). If the special color first printing is not set (No at step S1003), the printability determining unit 212 determines that the one pass printing is not executable (step S1005).

If the process unit number corresponding to the special color is 5 (5 at step S1002), i.e., if the special color process unit 22 is disposed most downstream, the printability determining unit 212 determines whether the special color later printing is set, i.e., whether the special color printing is set to follow the regular printing, based on the print order included in the print settings (step S1006). If the special color later printing is set (Yes at step S1006), the printability determining unit 212 determines that the one pass printing is executable (step S1004). If the special color later printing is not set (No at step S1006), the printability determining unit 212 determines that the one pass printing is not executable (step S1007).

If the process unit number corresponding to the special color is neither 1 or 5 (NEITHER 1 OR 5 at step S1002), it is assumed that the first printer 2A or the second printer 2B specified as the output destination device is not capable of performing the special color printing or not capable of performing the special color printing before or after the regular printing. The printability determining unit 212 therefore determines that the one pass printing is not executable (step S1007).

FIGS. 16A and 16B are a sequence diagram illustrating processes up to a step at which the printer driver 201 according to the embodiment transmits the print job to the first printer 2A or the second printer 2B. When the user performs an operation of allowing or disallowing the two pass printing via the multiple pass setting area 314 of the print setting screen 301 in the user I/F 36 of the information processing apparatus 3 (step S201), the setting unit 211 stores in the print setting DB 219 two pass printing setting information as to whether to execute the two pass printing (step S202).

Thereafter, the user issues a print start instruction via the user I/F 36 of the information processing apparatus 3 (step S211), and the setting unit 211 acquires the two pass printing setting information from the print setting DB 219 (step S212).

If the two pass printing is not allowed, the setting unit 211 requests the print job output unit 216 to output a print job for executing the one pass printing (step S221). In response to the request, the print job output unit 216 starts generating the print job for executing the regular printing with the CMYK toners and the special color printing with the W toner as the one pass printing (step S222), and requests the job ticket generating unit 215 to generate a job ticket (step S223). In this request, the print job output unit 216 uses an argument indicating that there is no job order specification. Job order specification is information specifying the details of the job for each of passes in the multiple pass printing. Since the one pass printing is to be executed in this case, there is no job order specification. In response to the request, the job ticket generating unit 215 acquires the print settings from the print setting DB 219, and generates the job ticket corresponding to the print settings (step S224). The print job output unit 216 generates the print job based on the generated job ticket, and transmits the generated print job to the first printer 2A or the second printer 2B specified as the output destination device (step S225).

If the two pass printing is allowed, the setting unit 211 requests the print job output unit 216 to output a print job for executing the two pass printing (step S231). In response to the request, the print job output unit 216 starts a job type determination process of determining the respective job types of the first job to be executed in the first pass and the second job to be executed in the second pass (step S232). The print job output unit 216 acquires the print order 351 from the print setting DB 219 (step S233), and determines that the first job is printing with the type of toner corresponding to the number "1" in the print order. In the example illustrated in FIG. 13, the print job output unit 216 determines that the first job is the special color printing with the W toner. Further, the print job output unit 216 determines that the second job is printing with the type of toner corresponding the number "2" in the print order. In the example illustrated in FIG. 13, the print job output unit 216 determines that the second job is the regular printing with the CMYK toners.

The print job output unit 216 first starts generating the print job to be executed as the first job (step S234). The print job output unit 216 requests the job ticket generating unit 215 to generate the job ticket corresponding to the job to be executed as the first job (step S235). In this request, the print job output unit 216 uses an argument indicating that the job order specification is the first job, and that the toner type is the CMYK toners or the W toner (i.e., the W toner in the example illustrated in FIG. 13). In response to the request, the job ticket generating unit 215 acquires the print settings from the print setting DB 219, and generates the job ticket corresponding to the job to be executed as the first job (step S236). Thereafter, the print job output unit 216 copies the PDL data (step S237), and temporarily holds the PDL data to be used in the second job. The print job output unit 216 then generates the print job of the first job based on the generated job ticket, and transmits the generated print job to the first printer 2A or the second printer 2B specified as the output destination device in a regular mode (step S238). The print job transmitted in the regular mode is executed immediately after being received by the first printer 2A or the second printer 2B specified as the output destination device.

Thereafter, the print job output unit 216 starts generating the print job to be executed as the second job determined in the above-described job type determination process (step S239). The print job output unit 216 requests the job ticket generating unit 215 to generate the job ticket corresponding to the job to be executed as the second job (step S240). In this request, the print job output unit 216 uses an argument indicating that the job order specification is the second job, and that the toner type is the CMYK toners or the W toner (i.e., the CMYK toners in the example illustrated in FIG. 13). In response to the request, the job ticket generating unit 215 acquires the print settings from the print setting DB 219, and generates the job ticket corresponding to the job to be executed as the second job (step S241). Thereafter, the print job output unit 216 acquires the copy of the temporarily held PDL data (step S242), generates the print job of the second job based on the generated job ticket, and transmits the generated print job to the first printer 2A or the second printer 2B specified as the output destination device in a suspend mode (step S243).

The print job transmitted in the suspend mode is received by the first printer 2A or the second printer 2B specified as the output destination device, and the execution of the print job is suspended until the user performs a predetermined operation, such as an operation on the user I/F 16 of the first printer 2A or the second printer 2B, for example. In the two pass printing, the user may reset the sheet in the sheet feeding unit 17 after the first pass. In the multiple pass printing, therefore, it is preferable to start printing after issuance of an instruction from the user in each of second and subsequent passes. In the case of a printer not requiring the user to reset the sheet in the second and subsequent passes, such as a printer that automatically transports the sheet to a sheet feeding unit after the first pass, for example, it is possible to continue to use the regular mode in the second and subsequent passes.

Figure 17:
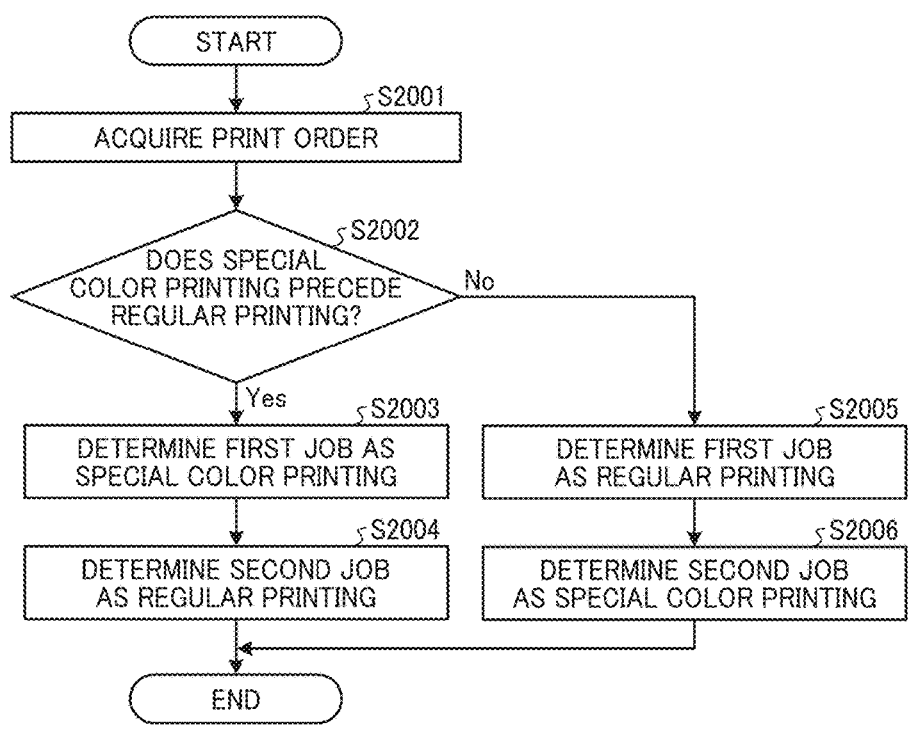
FIG. 17 is a flowchart illustrating a job type determination process performed by a print job output unit of the printer driver according to the embodiment.

FIG. 17 is a flowchart illustrating the job type determination process performed by the print job output unit 216 according to the embodiment. The print job output unit 216 acquires from the print setting DB 219 the information representing the print order 351 included in the print setting information of the printing to be executed (step S2001). Based on the acquired print order 351, the print job output unit 216 determines whether the special color printing is set to precede the regular printing (step S2002). If the special color printing is set to precede the regular printing (Yes at step S2002), the print job output unit 216 determines that the job to be executed as the first job is the special color printing (step S2003), and determines that the job to be executed as the second job is the regular printing (step S2004). If the special color printing is not set to precede the regular printing (No at step S2002), the print job output unit 216 determines that the job to be executed as the first job is the regular printing (step S2005), and determines that the job to be executed as the second job is the special color printing (step S2006).

FIG. 18 is a flowchart illustrating the job ticket generation process performed by the job ticket generating unit 215 according to the embodiment. The job ticket generating unit 215 acquires from the print setting DB 219 the current values of the print settings of the printing to be executed (step S3001). The job ticket generating unit 215 checks the job order specification and the toner type in the argument of the job ticket generation request transmitted from the print job output unit 216 at step S223 or the arguments of the job ticket generation requests transmitted from the print job output unit 216 at steps S235 and S240 (step S3002).

The job ticket generating unit 215 determines whether there is job order specification (step S3003). If there is no job order specification (No at step S3003), the job ticket generating unit 215 generates the job ticket based on the acquired current values of the print settings (step S3009). If there is job order specification (Yes at step S3003), the job ticket generating unit 215 determines whether the job order specification is the first job (step S3004). If the job order specification is the first job (Yes at step S3004), the job ticket generating unit 215 sets post-processing setting values OFF (step S3005). That is, the job ticket generating unit 215 disables post-processing functions of the finisher 19, such as stapling and punching. Thereafter, the job ticket generating unit 215 determines whether the toner type is the special color (W) toner (step S3006). If the job order specification is not the first job (No at step S3004), the job ticket generating unit 215 executes the process of step S3006 by skipping the process of step S3005.

If the toner type is the special color (W) toner (Yes at step S3006), the job ticket generating unit 215 sets separate plate print setting values such that the special color value is ON and the regular color value is OFF (step S3007). The job ticket generating unit 215 then generates the job ticket based on data including these separate plate print setting values (step S3009). If the toner type is not the special color (W) toner (No at step S3006), the job ticket generating unit 215 sets the separate plate print setting values such that the special color value is OFF and the regular color value is ON (step S3008). The job ticket generating unit 215 then generates the job ticket based on data including these separate plate print setting values (step S3009).

Figure 19A:
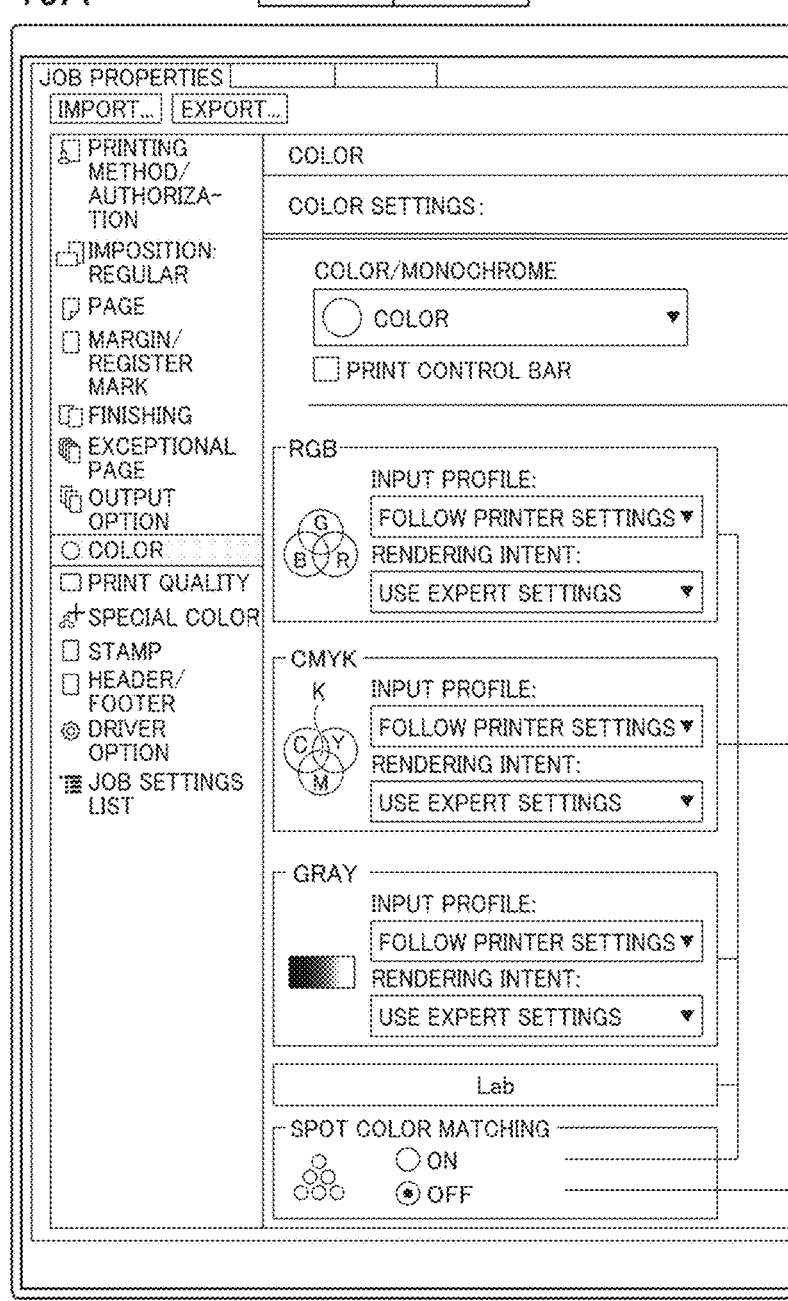

FIGS. 19A and 19B are a diagram illustrating a separate plate print setting screen 401 according to the embodiment. The separate plate print setting screen 401 is an example of the GUI displayed on the display of the information processing apparatus 3 by the setting unit 211. The separate plate print setting screen 401 includes a regular color setting area 411 and a special color setting area 412. The regular color setting area 411 is configured to allow the user to specify whether or not to execute printing for each of the regular colors (i.e., the CMYK colors in the present example). The special color setting area 412 is configured to allow the user to specify whether or not to print the special color. If there are a plurality of special colors (e.g., white, transparent, and gloss colors), the special color setting area 412 may be configured to allow the user to specify whether or not to execute printing for each of the special colors similarly as in the specification of the regular colors.

FIG. 20 is a table illustrating a data stricture of separate plate print setting information 501 according to the embodiment. In the separate plate print setting information 501, the color (i.e., the C, M, Y, K, or W color), a parameter ON or OFF indicating whether or not to print, and the effect are associated with each other.

A program realizing the functions of the above-described print system 1 is provided as a computer program product stored in a computer-readable memory medium, such as a compact disc (CD)-ROM, a memory card, a CD-recordable (CD-R), or a digital versatile disc (DVD), in the form of an installable or executable file.

The program may be stored in a computer connected to the network 4 such as the Internet, and may be provided as downloaded from the computer via the network 4. Further, the program may be provided via the network 4 without being downloaded. Further, the program may be provided as previously stored in a memory device of the information processing apparatus 3, such as the ROM 33 or the HDD 34, and a memory device of each of the first printer 2A and the second printer 2B, such as the ROM 13 or the nonvolatile memory 14. Further, the program may be configured as a module including functions of functional units of the print system 1 realizable by a program. The functions realized by the program are loaded on a main memory device such as the RAM 12 or the RAM 32 when the program is read and executed from the memory medium. That is, the functions realized by the program are generated in the main memory device.

According to the above-described embodiment, whether the one pass printing is executable in the print order set by the user is determined based on the device information 111 of each of the first printer 2A and the second printer 2B, and the determination is notified to the user. Even if the user is unaware of the relative positions of the regular process unit 21 and the special color process unit 22 in the first printer 2A or the second printer 2B specified as the output destination device, therefore, the user is capable of performing appropriate print settings as intended, avoiding a print error.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. A print control apparatus to control a plurality of printers, each of the plurality of printers including a first printing mechanism to perform a first printing process with a first paint and a second printing mechanism to perform a second printing process with a second paint, the print control apparatus comprising:
   circuitry configured to
      set, based on an operation performed by a user, a print order in which the first printing process and the second printing process are to be executed;
      generate a print job based on the print order;
      acquire device information representing relative positions of the first printing mechanism and the second printing mechanism;
      determine whether the print job is executable in one pass printing based on the print order and the device information;
      notify the user of information indicating whether the one pass printing is executable;
      retrieve at least one of the plurality of printers capable of executing the print job in the one pass printing based on the print order and the device information; and
      notify the user of information identifying the at least one of the plurality of printers retrieved, capable of executing the print job in the one pass printing.

2. The print control apparatus of claim 1, wherein the first paint is different from the second paint, and is used to perform color printing.

3. The print control apparatus of claim 1, further comprising a user interface, wherein the circuitry is further configured to control display of an image visualizing the print order on the user interface.

4. The print control apparatus of claim 1, wherein upon the circuitry determining that the one pass printing is inexecutable, the circuitry is configured to perform a process of prompting the user to select whether to execute multiple pass printing of executing, as the print job that is generated, a plurality of print jobs in a plurality of passes, and
   in response to a selection of the user to execute the multiple pass printing, the circuitry is configured to generate the plurality of print jobs for the respective plurality of passes.

5. The print control apparatus of claim 4, wherein the plurality of printers each further include a post-processing mechanism to perform post-processing on a printed medium,
   wherein the circuitry of the print control apparatus is configured to perform post-processing settings for the post-processing based on an operation performed by the user, and
   wherein the plurality of print jobs being generated are usable by the circuitry to instruct performance of the post-processing on a relatively last one of the plurality of print jobs based on the post-processing settings.

6. The print control apparatus of claim 1, wherein the circuitry is configured to perform separate plate settings for separate plate printing of printing a specified color selected from a plurality of colors of the first paint and the second paint based on an operation performed by the user, and
   wherein the circuitry is configured to generate the print job to print the specified color.

7. A print system comprising:
   a plurality of printers, each including
      a first printing mechanism to perform a first printing process with a first paint, and
      a second printing mechanism to perform a second printing process with a second paint; and a print control apparatus connected to the plurality of printers via a network, and including circuitry configured to
set, based on an operation performed by a user, a print order in which the first printing process and the second printing process are to be executed,
generate a print job based on the print order,
acquire device information representing relative positions of the first printing mechanism and the second printing mechanism,
determine whether the print job is executable in one pass printing based on the print order and the device information,
notify the user of information indicating whether the one pass printing is executable,
retrieve at least one of the plurality of printers capable of executing the print job in the one pass printing based on the print order and the device information, and
notify the user of information identifying the at least one of the plurality of printers retrieved, capable of executing the print job in the one pass printing.

8. The print system of claim 7, wherein the first paint is different from the second paint, and is used to perform color printing.

9. The print system of claim 7, further comprising a user interface, wherein the circuitry of the-print control apparatus is further configured to control display of an image visualizing the print order on the user interface.

10. The print system of claim 7, wherein upon the circuitry of the print control apparatus determining that the one pass printing is inexecutable, the circuitry of the-print control apparatus is configured to perform a process of prompting the user to select whether to execute multiple pass printing of executing, as the print job that is generated, a plurality of print jobs in a plurality of passes, and
in response to a selection of the user to execute the multiple pass printing, the circuitry of the-print control apparatus is configured to generate the plurality of print jobs for the respective plurality of passes.

11. The print system of claim 10, wherein the plurality of printers each further include a post-processing mechanism to perform post-processing on a printed medium,
wherein the circuitry of the print control apparatus is configured to perform post-processing settings for the post-processing based on an operation performed by the user, and
wherein the plurality of print jobs being generated are usable by the circuitry of the print control apparatus to instruct performance of the post-processing on a relatively last one of the plurality of print jobs based on the post-processing settings.

12. The print system of claim 7, wherein the circuitry of the print control apparatus is configured to perform separate plate settings for separate plate printing of printing a specified color selected from a plurality of colors of the first paint and the second paint based on an operation performed by the user, and
wherein the circuitry of the print control apparatus is configured to generate the print job to print the specified color.

13. A non-transitory recording medium storing a plurality of instructions which, when executed by one or more processors that control a plurality of printers, each of the plurality of printers including a first printing mechanism to perform a first printing process with a first paint and a second printing mechanism to perform a second printing process with a second paint, cause the one or more processors to perform a print controlling method comprising:
setting, based on an operation performed by a user, a print order in which the first printing process and the second printing process are to be executed;
generating a print job based on the print order;
acquiring device information representing relative positions of the first printing mechanism and the second printing mechanism;
determining whether the print job is executable in one pass printing based on the print order and the device information;
notifying the user of information indicating whether the one pass printing is executable;
retrieving at least one of the plurality of printers capable of executing the print job in the one pass printing based on the print order and the device information; and
notifying the user of information identifying the at least one of the plurality of printers retrieved, capable of executing the print job in the one pass printing.

14. The non-transitory recording medium of claim 13, wherein the print controlling method further comprises displaying an image visualizing the print order on a user interface.

15. The non-transitory recording medium of claim 13, wherein the print controlling method further comprises:
performing upon determining that the one pass printing is inexecutable, a process of prompting the user to select whether to execute multiple pass printing of executing, as the print job that is generated, a plurality of print jobs in a plurality of passes; and
generating, in response to a selection of the user to execute the multiple pass printing, the plurality of print jobs for the respective plurality of passes.

16. The non-transitory recording medium of claim 15, wherein the plurality of printers each further include a post-processing mechanism to perform post-processing on a printed medium,
wherein the print controlling method further comprises performing post-processing settings for the post-processing based on an operation performed by the user, and
wherein the plurality of print jobs being generated are usable to instruct performance of the post-processing on a relatively last one of the plurality of print jobs based on the post-processing settings.

17. The non-transitory recording medium of claim 13, wherein the print controlling method further comprises:
performing separate plate settings for separate plate printing of printing a specified color selected from a plurality of colors of the first paint and the second paint based on an operation performed by the user; and
generating the print job to print the specified color.

18. The non-transitory recording medium of claim 13, wherein the first paint is different from the second paint, and is used to perform color printing.

* * * * *